Dec. 10, 1929.  E. KOPPL  1,738,589
INCLINATION INDICATOR
Filed May 14, 1928  3 Sheets-Sheet 1
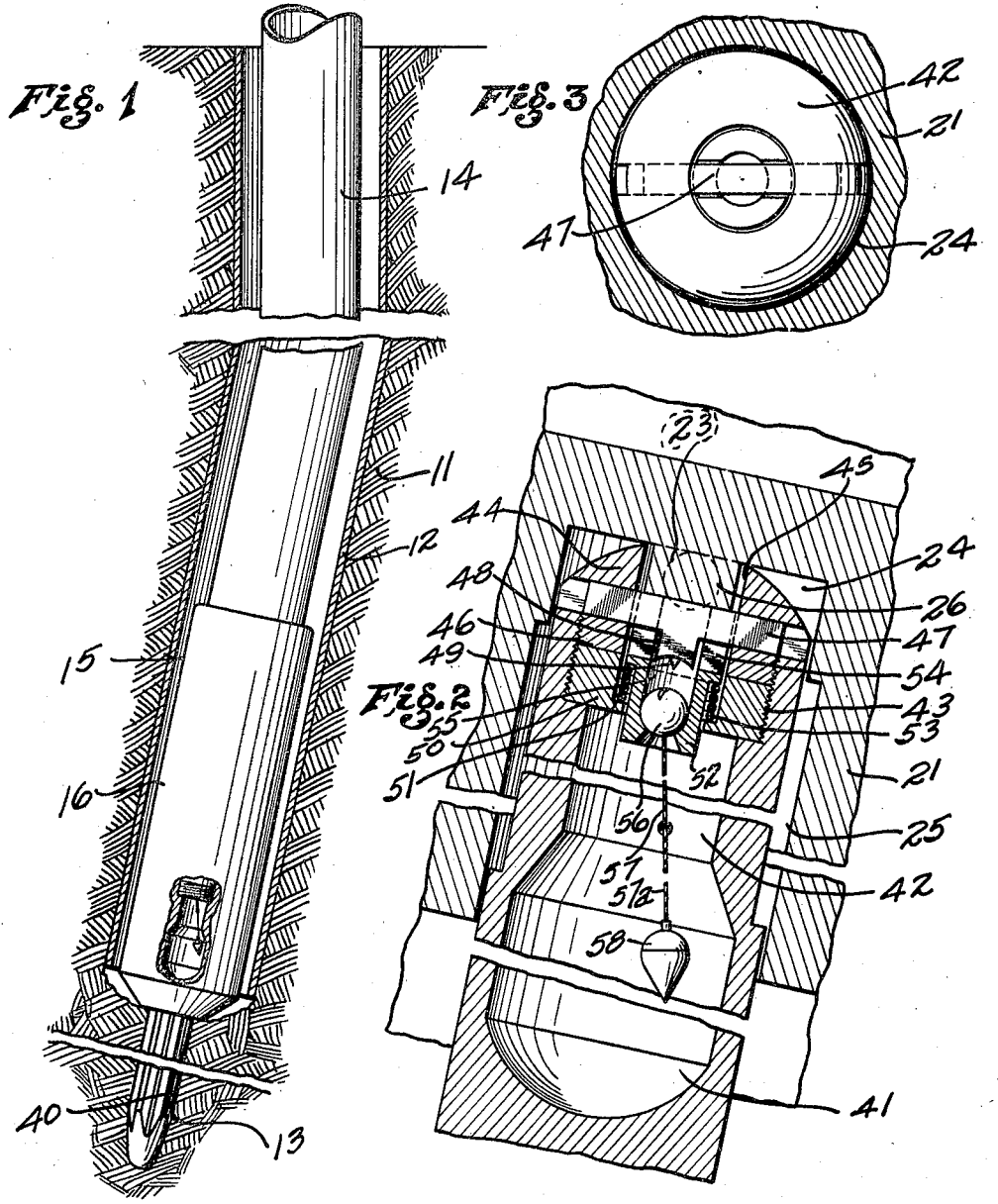
INVENTOR.
Ernest Koppl
BY Nestall and Nallace
ATTORNEYS Dec. 10, 1929.  E. KOPPL  1,738,589
INCLINATION INDICATOR
Filed May 14, 1928  3 Sheets-Sheet 2

INVENTOR
Ernest Koppl
BY Westall and Wallace
ATTORNEYS

Dec. 10, 1929.  E. KOPPL  1,738,589
INCLINATION INDICATOR
Filed May 14, 1928  3 Sheets-Sheet 3

INVENTOR.
Ernest Koppl
BY *Nestall and Wallace*
ATTORNEYS

Patented Dec. 10, 1929

1,738,589

UNITED STATES PATENT OFFICE

ERNEST KOPPL, OF LONG BEACH, CALIFORNIA

INCLINATION INDICATOR

Application filed May 14, 1928. Serial No. 277,409.

This invention relates to a means or instrumentality for determining the inclination of well holes, and is especially applicable to exploring well holes to determine their direction. In drilling well holes of great depth, few holes so drilled are substantially straight. It becomes advantageous to determine the inclination of such holes. It is also a practice to capture samples from the well hole to determine the character of the formation and the nature of the strata. This is currently done by coring. It has also been desirable to determine the inclination of the strata. This may be accomplished, if the inclination of the core to the vertical can be determined.

This invention has for its objects any or all of the following features: first, the provision of means which will indicate the vertical with respect to the axis of a hole; second, the provision of such means which can be positively marked while in the hole; and third, the provision of such means which can be actuated at any portion of the hole.

In addition to the broader objects of this invention, there are certain details of structure and objects incidental to the structure as will more fully appear hereinafter. As illustrative of the invention, embodiments thereof are shown in the accompanying drawings, in which:—

Figure 6:
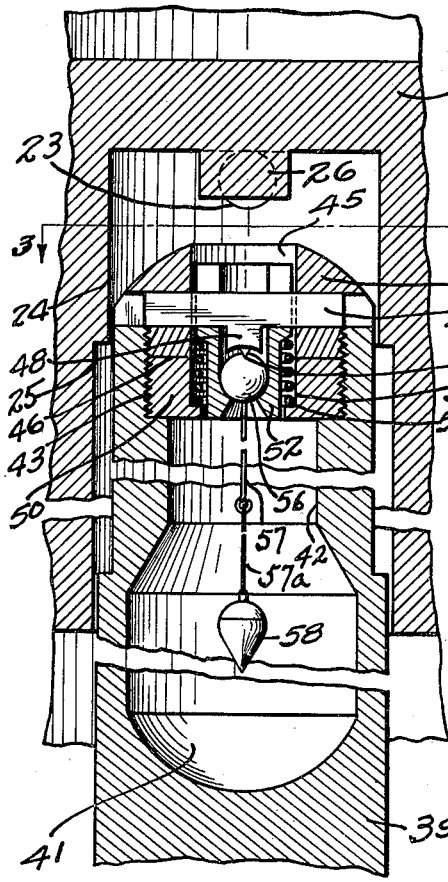
Figure 7:
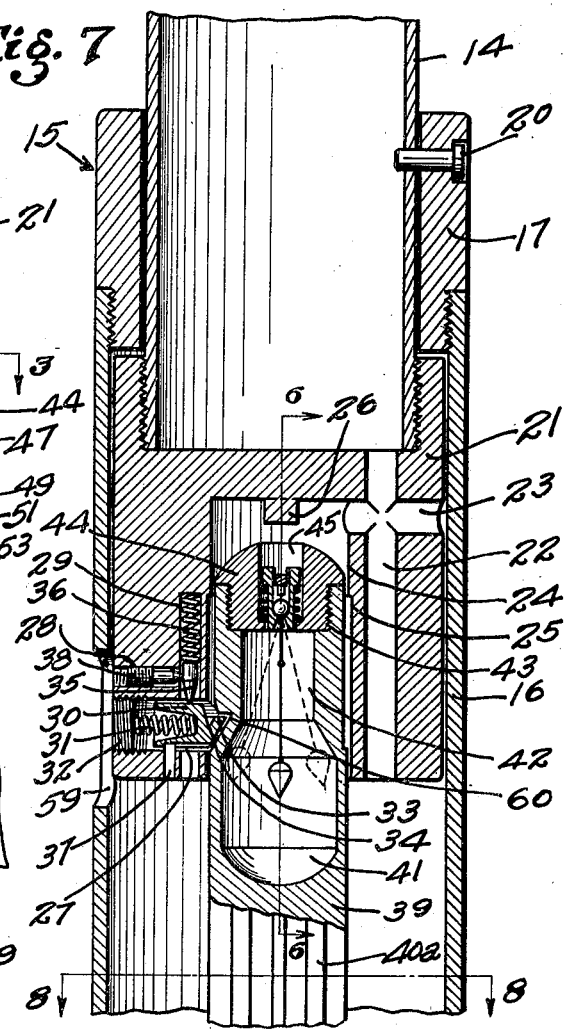
Figure 8:
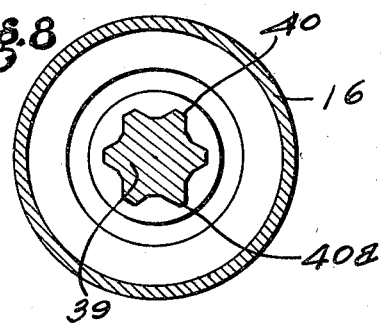
Figure 9:
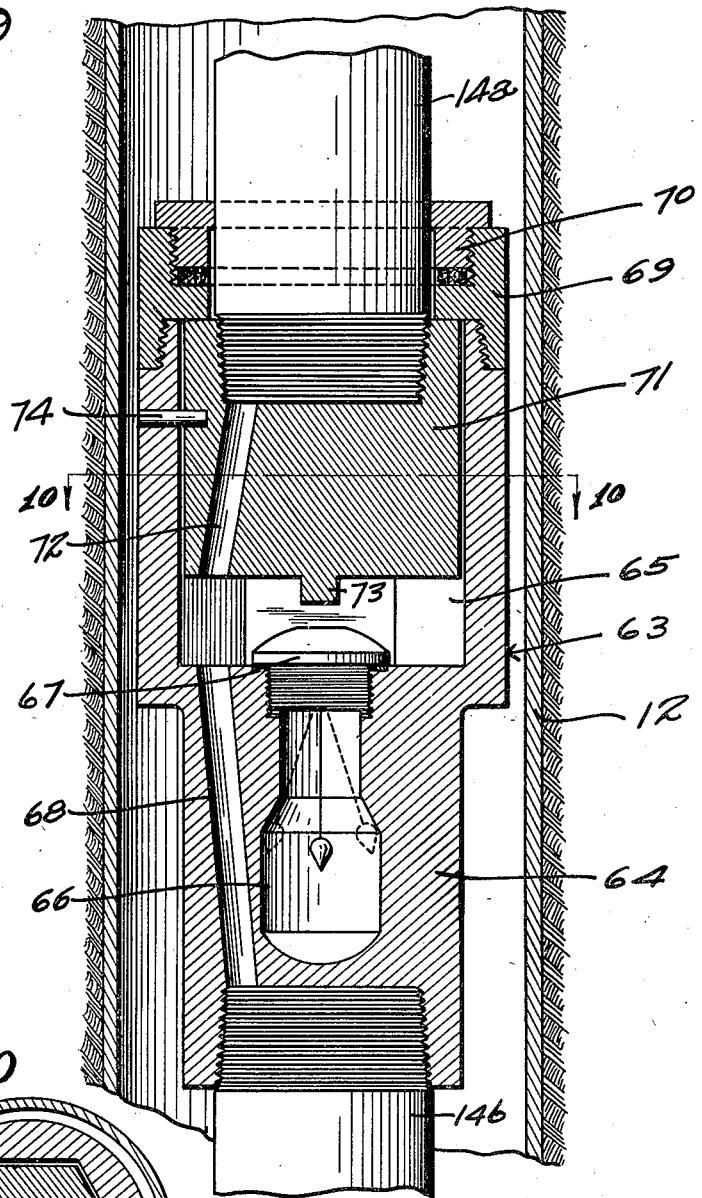
Figure 10:
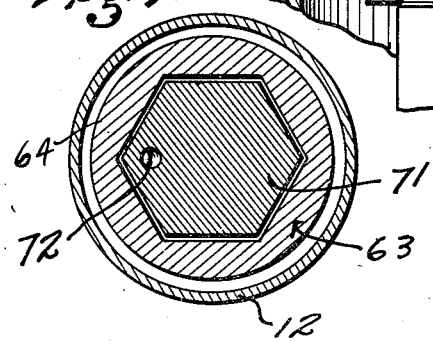

Fig. 1 shows a well hole which is inclined to the vertical, a portion thereof being broken away, and an inclinometer for insertion in a small hole at the bottom. Fig. 2 is a longitudinal section through the inclinometer shown in Fig. 1 on an enlarged scale with the indicator released; Fig. 3 is a section as seen on the line 3—3 of Fig. 6; Figs 4 and 5 are plan views of the ball indicator with markings thereon; Fig. 6 is a view similar to Fig. 2 showing the imprinter in position marking the ball as seen on the line 6—6 of Fig. 7; Fig. 7 is a longitudinal section through the inclinometer shown in Figs. 1 to 6 and at right angles thereto with the retaining head; Fig. 8 is a section as seen on the line 8—8 of Fig. 7; Fig. 9 is an elevation partly in section of an embodiment of the inclinometer adapted to be inserted in the drill or exploratory string; and Fig. 10 is a section as seen on the line 10—10 of Fig. 9.

Referring with more particularity to the drawings, and especially Figs. 1 to 8 inclusive, a well hole is indicated by 11, and disposed therein is casing 12. At the bottom of the hole is a small hole 13 termed by drillers a "rat hole". This well hole is shown crooked as is the case in many instances.

Extending into the well hole is a drill string 14, to which an inclination indicator 15 is secured. The drill string and indicator are so connected that they may be turned at the top of the well hole and the amount of the angular movement of the indicator will be the same as that of the drill string. Thus, the drill string may be marked, so that the horizontal angular position of the indicator will be determinable from the mark of the drill string. An inclinometer forming a part of the indicator is adapted to be placed in position at the bottom of the hole and released.

A cylindrical shell 16 is internally threaded at its ends, and secured to the upper end of the shell is a cylindrical head 17 with a bore for the drill pipe. Threaded in the lower end is a head 18 having a tapered lower end and an opening 19 therethrough for the passage of the inclinometer. A shear pin 20 secures the shell body to the drill pipe, it being disposed in the head 17 and the drill pipe string. Secured to the drill pipe at its lower end is a retainer body 21 freely slidable within the shell 16, and provided with a shoulder at the upper end engaging the head 17 so as to prevent separation. A water course 22 extends through the retainer body and is intersected by a lateral water course 23. At the center of the body is a bore 24 enlarged at 25. A lug 26 depends from the upper wall of the bore. Extending transversely through the retainer body and intersecting the bore 24 is an opening 27 threaded at the outer end. Extending parallel thereto and intersecting the bore is an opening 28. In the retainer body and extending longitudinally is a bore 29 intersecting openings 27 and 28. Slidably disposed in opening 27 is a detent 30 having a socket at its inner end to receive a compression spring 31 held in position by a closure plug 32. The detent has an outer end bevelled on the lower face and with a shoulder 33 at the upper end. At the shoulder is a cavity 34 serving as a seat for a keeper pin 35 mounted in bore 29. Tending to project the keeper pin is a compression spring 36. The relation of the keeper pin and detent is such that when the detent is fully retracted, the keeper pin 35 will seat in the cavity 34, and hold the detent from projection. A pin 37 is disposed in a key-way in the detent to hold the latter against turning, and to retain the shoulder uppermost. The opening 28 is threaded to receive a lock pin 38 for holding the keeper 35 in upper position.

Disposed within the bore 24 is the inclinometer comprising an elongated body 39 tapered at the lower end to provide point and having ribs 40 to provide corrugations. One of these ribs may be of such dimensions as to project a slightly greater distance from the body and serves as an indicator for determining angular position in the strata or formation after its release. This rib is indicated by 40$^a$. Any other suitable means on the inclinometer body would serve this purpose. In the body is a chamber 41 for a pendulum or plumb bob. The upper end of the chamber is reduced in diameter and marked 42. This reduced portion is counterbored at 43 and internally threaded to receive a cap 44. Extending axially through the cap is a bore 45. Disposed in a transverse bore 46 and fixed in position is an imprinter bar 47 having a lug 48 projecting downwardly therefrom and an indenter lug 49 at the end thereof. The lower face of the lug 48 is rounded to correspond to a ball later described. The imprinter bar 47 is fixed with relation to the cap. In the bore below the cap is a socket plug 50 having a shouldered bore 51 in registration with the bore 45 in the cap. Slidably mounted in the socket plug is a socket member 52 having a shoulder for a compression spring 53 embracing the socket member and tending to retract the member within the plug. The socket member is slotted at the upper end and marked 54 to receive the imprinter bar, and has a bore 55 for accommodation of the lug 48. The lower end of bore 55 is reduced in diameter and sloped to form a seat for a ball 56. This ball is preferably of soft metal adaptable to receive an imprint from the imprinter projection 49. The socket member and ball form a swivel, there being a rod or line 57 attached thereto, so that the ball will be caused to swing with the line. This line may be of comparatively rigid material. It may be rigid, such as a stiff wire and an extension thereof 57$^a$ may be of flexible material. Attached to the plumb line is a bob 58.

Normally the parts of the inclinometer are in the position shown in Figs. 6 and 7, the socket member being retracted and the ball 56 being clamped in position with the indenter sunk into the ball. In order to release the ball, the body 21 is positioned as shown in Fig. 2. The lug 26 is in engagement with the socket member and the latter projected so as to free the ball from the imprinter. In this position the plumb bob may position itself vertical. Suppose it is desired to take a core and determine its inclination. A hole 13 is drilled at the bottom of the well hole. The inclination indicator is then attached to the lower end of a drill or exploratory string 14. The parts of the indicator are in the position shown in Figs. 6 and 7, the shear pin 20 being in position. Preliminary to this, the detent 30 should be retracted, keeper 35 being raised and held in position by the lock pin 38. The inclinometer body is then inserted, the detent riding into the corresponding recess 60 in the body 39. The lock pin 38 is now retracted to free the keeper. Such setting may be conveniently performed through the window 59 formed in the shell 16. The ball 56, when it was positioned against the imprinter should be in vertical position. This will have caused an indentation in the ball marked 61$^a$ and particularly shown in Figs. 4 and 5. The ball is clamped in position. The position of the marker with respect to some line of the drill string is then noted. In this particular instance the relation of the rib 40$^a$ is noted. The indicator is then lowered to position with the marker body 40 embedded in the hole 13. The rotary drill pipe or drill string 14 is then forced downwardly so as to shear the pin 20 and cause the lug 26 on body 21 to enter the bore 45 in the cap and project the socket member 52, thereby releasing the ball 56 and permitting it to be moved by the plumb line as shown in Fig. 2. In this movement, the detent 30 will have been retracted, and the keeper 35 will have seated in the cavity 34, thereby holding the detent in its retracted position. The drill string is then raised, the marker being free and remaining in position in the formation, while the string is raised. A notation will have been made of the angular position of the drill string at the time of release. As the drill string is raised, the lug 26 is retracted, permitting the socket member to retract and clamp ball 56. This causes an indentation on the ball, such as 62$^a$ or 62$^b$ Figs. 4 and 5. The core may then be taken including the marker. Upon capturing the core, the inclinometer will be embedded therein and the marker body 40 will indicate the relation of the core to the cardinal points. The mark on the ball 56 will indicate the inclination.

It may be desirable to determine the inclination of the well hole at some intermediate point. For this purpose, the construction shown in Figs. 9 and 10 is used. The inclination indicator marked generally 63 is disposed between joints of drill pipes 14$^a$ and 14^b. It comprises a body 64 having a chamber 65 at the upper end communicating with a plumb bob chamber 66. The chamber 66 is of the same construction as heretofore described and closed by a cap 67 having an imprinter bar and a socket with a ball. A water course 68 extends through the body from the chamber 65 so as to communicate with the bottom of the body and with the continuation of the drill pipe. Secured to the upper end of the body is a packing plug 69 having a packing indicated generally by 70 to form a stuffing box for the drill pipe joint 14^a to slide therein. Secured to the drill pipe joint 14^a is a releasing body 71 having a water course 72 serving for communication of the pipe joint 14^a and the chamber 65, thereby providing for circulation through the indicator. A lug 73 depends from the releasing body 71. It will be noted that the releasing head 71 and the walls of chamber 65 are shaped to prevent rotation of the releasing body and body 64 with respect to one another. A shear pin 74 may be provided to hold the releasing head in its upper position.

The indicator is disposed in the drill string at the point at which the inclination of the well is to be determined, the parts being in the position shown in Fig. 9. The string is then lowered, until the bottom of the drill string engages either the bottom of the hole or such other obstruction as may be present therein. The plumb bob will have been clamped in vertical alignment. The drill string is then forced downwardly to shear the pin 74 and cause the lug 73 to release the plumb bob ball. This will cause the plumb bob to swing to vertical position. Upon raising the drill string, the ball will again be clamped and marked to indicate the inclination of the well hole with respect to the vertical. Some marking should be made upon the drill pipe and noted so that the inclination with respect to the cardinal points may be determined.

What I claim is:—

1. An instrument for determining inclination comprising a supporting body, a plumb line, a ball secured to said plumb line, a socket in said body for said ball so as to swivel said line to said body, an imprinter for marking said ball, and means to actuate said imprinter at will.

2. An instrument for determining inclination comprising a supporting body, a plumb line, said body having a socket, a ball mounted in said socket and supporting said plumb line, and a marker for imprinting indicia on said ball to indicate the position thereof, and means to actuate said marker at will.

3. An instrument for determining inclination comprising a body having means for securing it in a hole and to indicate the cardinal points, a plumb line, means for freely suspending said line, an indicator body secured to said line so as to be swung therewith, a marker for imprinting indicia to indicate the position of said indicator, and means to actuate said marker at will.

4. An instrument for determining inclination comprising a body having means for securing it in a hole and to indicate the cardinal points, a plumb line swivelled to said body, an indicator secured to said line so as to be swung therewith, an imprinter for marking said indicator, and means to actuate said imprinter at will.

5. An instrument for determining inclination comprising a supporting body, a plumb line, a ball secured to said plumb line, a socket in said body for said ball so as to swivel said line to said body, a ball grip having imprinting means for marking said ball to indicate its position, means tending to hold said grip in ball locking position, and means to actuate said grip to release said ball.

6. An instrument for determining inclination comprising a body having means for securing it in a hole to indicate the cardinal points, a plumb line, a ball secured to said plumb line, a socket in said body for said ball so as to swivel said line to said body, a ball grip having imprinting means for marking said ball, means tending to hold said grip in ball locking position, and means to actuate said grip to release said ball.

7. An instrument for determining inclination comprising a body having a chamber, a split socket plug in said chamber, one of the sections of said socket having an imprinting device, means tending to contract said socket sections, a ball in said socket, a plumb line secured to said ball, and releasing means for holding said socket sections in expanded position to free said ball.

8. An instrument for determining inclination comprising a body having means for securing it in a hole to indicate the cardinal points, said body having a chamber, a split socket plug in said chamber, one of the sections of said socket having an imprinting device, means tending to contract said socket sections, a ball in said socket, a plumb line secured to said ball, and releasing means for holding said socket sections in expanded positions to free said ball.

9. An instrument for determining inclination comprising a head adapted to be secured to a string for lowering in a well hole, a body detachably secured to said head and having means for securing it in a hole to indicate the cardinal points, said body having a chamber, a split socket plug in said cavity, one of the sections of said socket having an imprinting device, means tending to contract said socket sections, a ball in said socket, a plumb line secured to said ball, releasing means for holding said socket sections in expanded position to free said ball.

10. An instrument for determining inclination comprising a body having a chamber, a split socket plug in said chamber, one of the sections of said socket being movable and having an indenter, the other section being fixed to said body, spring means tending to contract said socket sections, a ball in said socket, a plumb line secured to said ball, releasing means for engaging and holding the movable socket section in expanded position to free said ball.

11. An instrument for determining inclination comprising a body having means for securing it in a hole to indicate the cardinal points, said body having a chamber, a split socket plug in said chamber, one of the sections of said plug being movable and having an indenter, the other section of said plug being fixed to said body, spring means tending to contract said socket sections, a ball in said socket plug, a plumb line secured to said ball, and releasing means for engaging said movable socket section and holding it in expanded position to free said ball.

12. An instrument for determining inclination comprising a head adapted to be secured to a string for lowering in a well hole, a body detachably secured to said head, said body having a chamber, a split socket plug in said chamber, one of the sections of said socket plug being movable and having an indenter, the other section of said socket plug being fixed to said body, spring means tending to contract said socket section, a ball in said socket plug, a plumb line secured to said ball, and releasing means for engaging the movable section of said plug and holding the socket section in expanded position to free said ball.

In witness that I claim the foregoing I have hereunto subscribed my name this 16th day of April, 1928.

ERNEST KOPPL.